June 16, 1931. F. E. NEWCOMB 1,809,907
RUBBING OR SANDING PAD
Filed Jan. 31, 1930
Fig. 1
Fig. 3
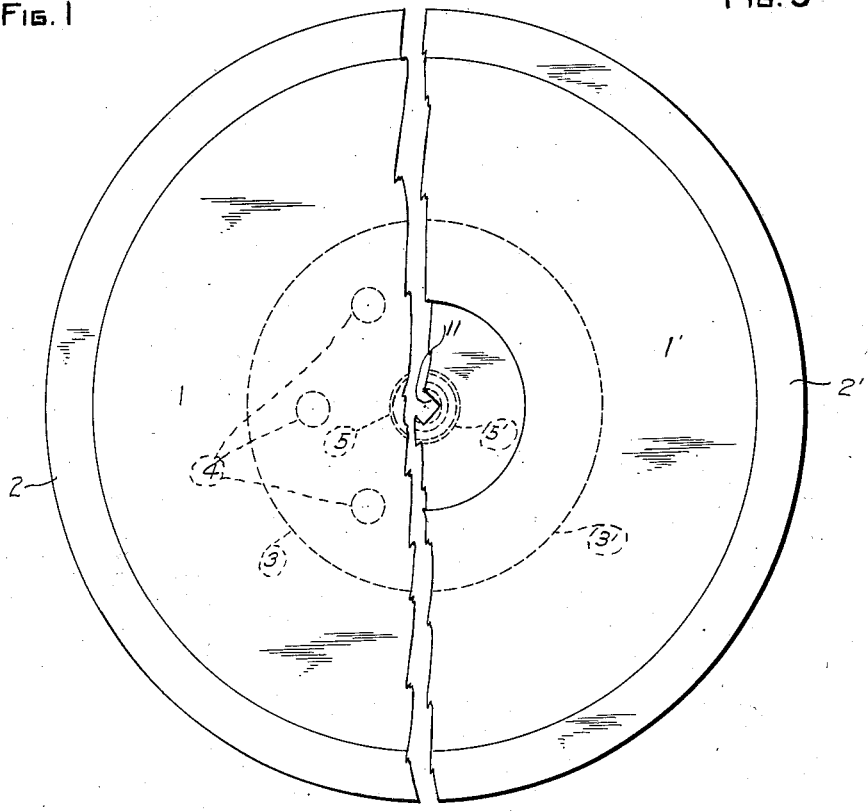
Fig. 2
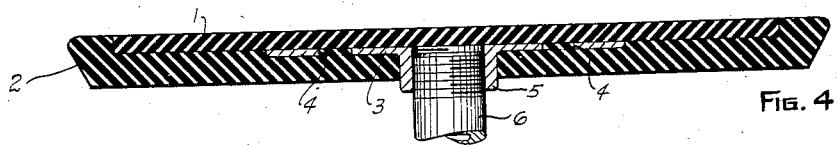
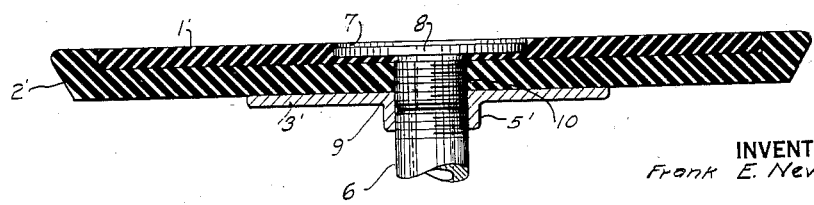
Fig. 4
INVENTOR
Frank E. Newcomb
BY
ATTORNEY Patented June 16, 1931

1,809,907

UNITED STATES PATENT OFFICE

FRANK E. NEWCOMB, OF EAST CLEVELAND, OHIO

RUBBING OR SANDING PAD

Application filed January 31, 1930. Serial No. 424,852.

My invention relates to a rubber disk which is used for sanding down auto bodies and the like.

The ordinary hard rubber disk is prone to cut into, scratch or otherwise mar the particular portion of the body which the hard rubber edge of the disk comes in contact with, especially when working around corners, curves, etc. that are found in the general run of auto bodies, thus necessitating retouching of the scratched or marred parts and thereby adding more time and work on the job.

To overcome these objections I have conceived a rubber disk whose edges are soft and pliable and which will not cut, scratch or mar the surface of the body.

Another object of the invention is to provide a cheap, easily manufactured article that will do the work in an improved manner.

The further advantages of the invention will more fully appear from the following specifications and accompanying drawings, in which:

Fig. 1 is a half plan view of one form of the disk.

Fig. 2 is a sectional view of the same.

Fig. 3 is a half plan view of another form which may be used.

Fig. 4 is a sectional view, similar to Fig. 2, of Fig. 3.

Again referring to the drawings:

The device consists of a hard rubber disk 1 which is inset and vulcanized into the soft rubber outer disk 2, the metal supporting base 3 being used as a core in the first mentioned form, having apertures 4 into which the soft rubber 2 may be vulcanized thus forming a complete unit each part united to the other. The metal base 3 has a threaded boss 5 into which the tube 6 is screwed to form a handle.

The other form consists of a hard rubber disk 1' in the center of which is a circular aperture 7 into which the metal disk 8 is inserted, the threaded shoulder portion 9 being inserted through the opening 10 in the soft outer disk 2' and into the boss 5' of the metal base 3'; the metal disk 8 being screwed into the boss 5' by the use of a key inserted in the square aperture 11 of the metal disk 8 which draws the said disk 8 below the surface of the hard rubber disk 1'. The aperture 11 is open through into the tube 6 to allow the water to flow through.

The flexibility of the outer soft rubber disk 2 or 2' permits the inner hard rubber disk 1 or 1' to do the sanding while the said disk 2 or 2' acts as a guard or bumper and thus prevents the usual scratches, cuts or mars on the machine body.

I claim:

1. A rubbing or sanding pad comprising a hard rubber disk, and a soft rubber back extending over the edge of the disk.

2. A rubbing or sanding pad comprising a hard rubber disk, and a soft rubber back extending over the edge of the disk, said disks being secured to a metal reinforcement.

3. A rubbing or sanding pad comprising a hard rubber disk, and a soft rubber back extending over the edge of the disk, and a metal core plate embedded in one of said disks.

4. A rubbing or sanding pad comprising a hard rubber disk, and a soft rubber back extending over the edge of the disk, and a core and handle to which the disks are secured.

5. A rubbing or sanding pad comprising a hard rubber disk and a soft rubber back molded thereto and extending over the edge of the disk.

6. A rubbing or sanding pad comprising a hard rubber disk, and a soft rubber back extending over the edge of the disk, and a metal core plate between said disk and back which are molded thereon.

In testimony whereof, I do affix my signature.

FRANK E. NEWCOMB.